United States Patent [19]

Marsch

[11] Patent Number: 4,731,098

[45] Date of Patent: Mar. 15, 1988

[54] DEVICE FOR MANUFACTURING A PRODUCT GAS CONTAINING HYDROGEN AND CARBON OXIDE

[75] Inventor: Hans-Dieter Marsch, Dortmund, Fed. Rep. of Germany

[73] Assignee: Uhde GmbH, Fed. Rep. of Germany

[21] Appl. No.: 16,658

[22] Filed: Feb. 19, 1987

[30] Foreign Application Priority Data

Feb. 22, 1986 [DE] Fed. Rep. of Germany ....... 3605811

[51] Int. Cl.$^4$ ........................... C01B 3/34; C01B 3/38; B01J 8/06
[52] U.S. Cl. ..................................... 48/95; 48/196 R; 48/196 A; 422/197; 422/203
[58] Field of Search .............. 48/196 R, 86 R, 196 A, 48/95, 215; 422/197, 196, 203, 310

[56] References Cited

U.S. PATENT DOCUMENTS

| | | | |
|---|---|---|---|
| 2,108,081 | 2/1938 | Shabaker et al. | 422/203 |
| 3,532,472 | 10/1970 | Foster | 422/197 |
| 4,183,897 | 1/1980 | Lanteri | 422/197 |
| 4,229,419 | 10/1980 | Haese | 422/197 |

FOREIGN PATENT DOCUMENTS 3244252 5/1984 Fed. Rep. of Germany .

*Primary Examiner*—Barry S. Richman
*Assistant Examiner*—Joye L. Woodard
*Attorney, Agent, or Firm*—Toren, McGeady & Associates

[57] ABSTRACT

A device for manufacturing a product gas containing hydrogen and carbon oxide from a feedgas mixture comprised substantiallty of hydrocarbon, includes a vessel partitioned by a tubesheet into an upper chamber and a lower chamber. Reformer tubes are mounted on and extend through the tubesheet from the upper chamber into the lower chamber. Each reformer tube is laterally enclosed over at least a portion of its axial length downwardly from the tubesheet by a jacket spaced outwardly therefrom forming an annular space extending along each said tube for establishing communication between the upper the lower chambers, allowing the product gas to be withdrawn from the upper chamber. The tubesheet forms a distribution chamber for directing the feedgas mixture into the reformer tubes. The tubesheet is formed of an inner hollow body mounted within an outer hollow body, with the two hollow bodies being in flow communication. Due to the arrangement of the hollow bodies forming the tubesheet and the jackets forming the annular spaces, the problem of reducing the pressure and temperature differences across the tubesheet is effected while maintaining good over-all performance of the reaction vessel.

8 Claims, 3 Drawing Figures

DEVICE FOR MANUFACTURING A PRODUCT GAS CONTAINING HYDROGEN AND CARBON OXIDE

BACKGROUND OF THE INVENTION

The present invention is directed to a device for use in the manufacture of a product gas containing hydrogen and carbon oxide from a feedgas mixture consisting substantially of hydrocarbon, particularly from natural gas mixed with steam, with the device including a vessel partitioned by a tube sheet into an upper chamber and a lower chamber and reformer tubes secured in the tubesheet and extending downwardly into the lower chamber where each tube is enclosed by a jacket for at least a part of its length.

A device of this kind is known, for example, in DE-OS No. 32 44 252, filed by the applicant. The device includes a a vessel partitioned into two sections by a tubesheet located in the upper third of the vessel, that is, into a more voluminous reaction chamber with reformer tubes and a natural gas/steam chamber in the top section from where the natural gas/steam mixture is distributed to the reformer tubes.

The reformer tubes are jacketed within the reaction chamber. In this chamber, the jackets form a collecting space for discharging the reaction product through an outlet nozzle from the reaction chamber.

In this process the admission of pure oxygen into the reaction chamber and the mixing chamber, respectively, results in an exothermic reaction yielding the product gas. The reaction heat is utilized to heat the reformer tubes with the aid of the tube jackets. A disadvantage inherent in this known design is the exposure of the tubesheet to comparatively high differential pressures between the reaction chamber and the distribution chamber for the feedgas mixture. There is also the disadvantage of the high temperature differences across the tubesheet. The resulting heat loads, stresses, and the like tend to deteriorate the tubesheet. Conversely, the material quality required to satisfy such conditions aggravates the conditions for an economical fabrication of the tubesheet.

SUMMARY OF THE INVENTION

The primary object of the present invention is to reduce, by mechanical means, the pressure and temperature differences across the tubesheet without sacrificing the effective over-all performance of the reaction vessel.

In accordance with the present invention, in a device of the type described above, the tubesheet is constructed to serve as a distribution chamber for conducting the feedgas mixture into the reformer tubes and the tubesheet includes two hollow bodies, one positioned within the other with the interior of the hollow bodies being interconnected for the flow therebetween of the feedgas mixture.

The present invention permits the relocation into the tubesheet of the natural gas/steam space previously located in the top section of the reaction vessel, whereby the tubesheet was exposed to the pressure and temperature in that space while the previous natural gas/steam space serves as a collecting chamber for the product gas.

With the tubesheet formed as a dual compartment, the temperatures in this region are averaged and the feedgas mixture passing through the tubesheet is preheated.

In a preferred embodiment of the present invention, the inner hollow body of the tubesheet is arranged in a concentric position with respect to the fully enclosing outer hollow body and is equipped with at least one inlet line for the feedgas mixture.

Such a concentric arrangement permits, in particular, an equalization of the stresses produced within the tubesheet by the pressure and temperature differences, because a concentric arrangement affords the best possibility of achieving such an aim.

Preferably, the flow openings for the feedgas mixture are located on the underside of the inner hollow body and the flow openings for the connecting tubes from the outer hollow body to the upper or head sections of the reformer tubes are located on the upper side of the outer hollow body. This arrangement contributes to the equalization of the flow conditions and, consequently, to equalization of the temperatures, pressures and stresses, since the inner hollow body is exposed to a near-countercurrent flow of gas.

Basically, the reformer tube heads could be connected directly to the outer hollow body. It is more expedient, however, to install spearate tubes connecting the upper side of the hollow body to the reformer tubes in accordance with the present invention.

With reference to the wording of this application, it should be pointed out that the terms "upper" and "lower" are used in the description to denote the location of a structural element referred to any other element. The relationship may, of course, be different. It is possible that "upper" may be substituted for "lower," for example, when the device is placed in a head-down position or in an inclined position, whereby the terms "upper" and "lower" should be considered only in reference to the example described in this application.

Another preferred feature of the invention is the provide at least one connecting tube to each reformer tube. It would be possible to provide a plurality of connecting tubes to each reformer tube. It has been found, however, that one connecting tube for each reformer tube is a reasonable design.

In another feature of the invention, the jackets about the reformer tubes extend through the tubesheet and form an annular opening to the upper chamber. In such an arrangement there is the advantage that all structural elements can be arranged in a concentric position relative to one another, because a collecting chamber is no longer needed in the lower reaction space due to the special configuration and arrangement of the jackets.

For further lowering the temperature and pressure differences and the resulting stresses, the invention also provides the tubesheet with a corresponding number of sleeves for accommodating the jackets around the reformer tubes.

In principle, the jackets could be inserted directly into the tubesheet openings and fixed in place by a gastight weld. The provision of the sleeves, however, has the particular advantage, for example, that the reformer tubes and their jackets can be replaced individually. The reformer tubes and jackets can be suspended from a tubesheet as described above with the only remaining operation being the installation of the connecting tubes between the reformer tubes and the hollow tubesheet.

To obtain an annular gap penetrating deeply into the tubesheet while maintaining a seal between the two chambers separated by the tubesheet, in accordance with the invention, the inside diameter of the jackets, the headends, referred to the service position, of the sleeves and jackets being connected by a gastight joint while leaving the annular gap open on one side of the tubesheet.

In accordance with the invention, the head ends joined by a weld, for example, face the collecting chamber for the product gas. Such an arrangement assures optimum accessability of the sealing joint.

The invention finally provides for the reformer tubes to be supported by holding brackets resting on the joined head ends of the sleeves and jackets. This arrangement insures easy assembly and replacement as outlined above for the over-all system. A tubesheet prepared as described above can be prefabricated to carry sleeves and jackets before the reformer tubes are finally inserted and connected as described above.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
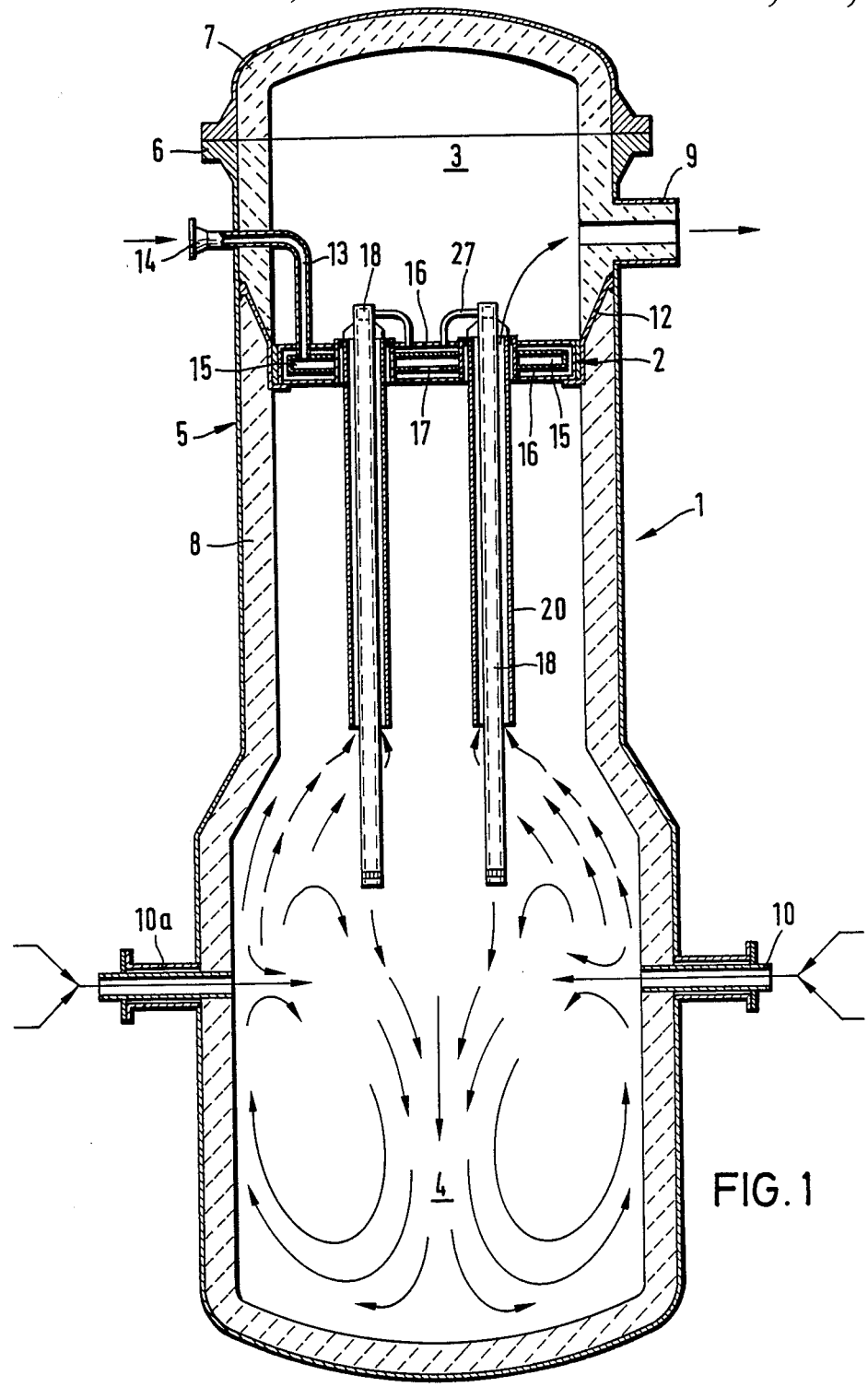
FIG. 1 is a vertical cross-sectional view of the device embodying the present invention.

As shown in FIG. 1, the device 1 embodying the present invention is a vertically-extending pressure vessel 5, partitioned by a horizontally-arranged tubesheet 2 into an upper chamber 3, and a lower chamber 4. The upper end of pressure vessel 5 is closed by a cover 7 with a flange connection 6 interconnecting the vessel and the cover. All areas on the interior of the vessel wall are covered with an insulation 8.

Upper chamber 3 serves as a collecting chamber for the product gas which flows out of the upper chamber of the device 1 through an upper nozzle 9. In the following description, the upper or collecting chamber 3 is referred to only as "chamber 3."

Lower chamber 4 is the reformer chamber, that is, it is equipped with nozzles 10, 10a, for the admission of the feedgases, such as natural gas and oxygen or air, as indicated by the arrangement of the arrows in FIG. 1. In the following description, the lower or reformer chamber is referred to only as "chamber 4."

Tubesheet 2 is fixed in place by holding assemblies 12 and it is arranged to serve as a distribution chamber for the feedgas mixture. Accordingly, an inlet line 13 extends horizontally from a nozzle 14 on the exterior of the vessel 5 into the chamber 3 and then downwardly into the tubesheet 2 for the admission of the feedgas mixture which may be a natural gas/steam mixture. Note the arrow at the nozzle 14 indicating the direction of flow into the vessel.

Figure 2:
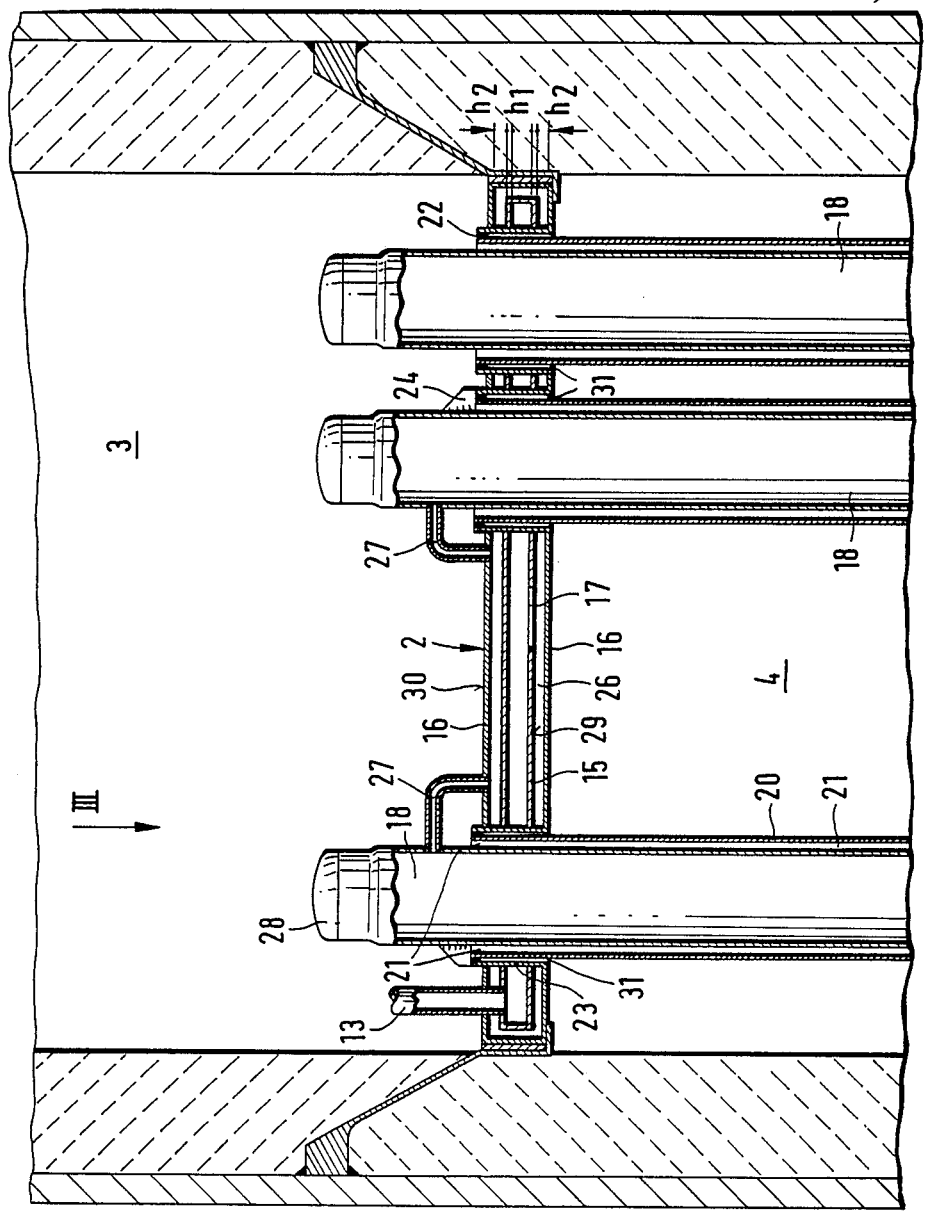
FIG. 2 is an enlarged partial vertical sectional view of the device shown in FIG. 1, in the region of the tubesheet.
Figure 3:
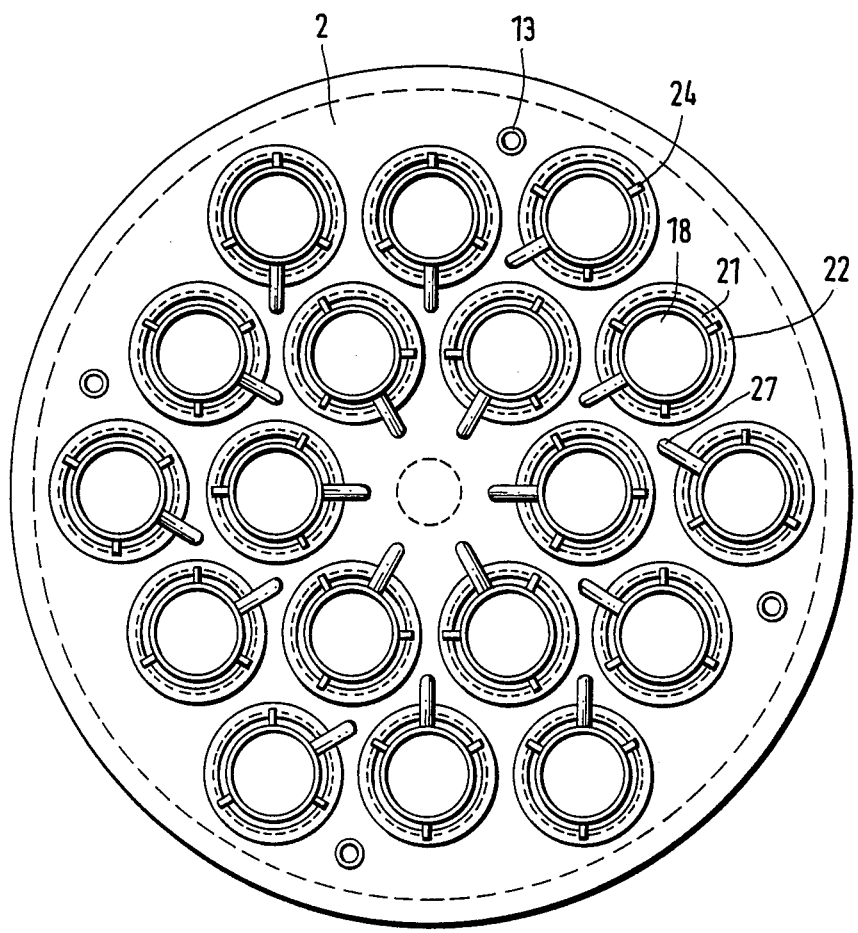
FIG. 3 is a plan view of the tubesheet taken in the direction of the arrow III in FIG. 2.

Tubesheet 2 includes an inner hollow body 15 enclosed by an outer hollow body 16. With the outer hollow body arranged symetrically around the inner hollow body. As shown in FIGS. 1 and 2, the inner hollow body 15 has flow openings 17 facing downwardly while the outer hollow body 16 is provided with flow openings facing upwardly for the connecting tubes 27. Connecting tubes 27 extend upwardly from the outer hollow body 16 into the head sections 28 of reformer tubes 18. The reformer tubes 18 are axially elongated with a short section extending upwardly into the chamber 3. The reformer tubes 18 pass downwardly from the chamber 3 through the tubesheet 2 into the chamber 4 with the tubes extending for a considerable axial length below the tubesheet. A jacket 20 laterally encloses each reformer tube 18 and is spaced outwardly from the tube forming an annular gap 21, note FIG. 2. The annular gap 21 is open at the top end of the jacket at the upper surface of the tubesheet 2, so that the gap provides a connection from chamber 4 into chamber 3, whereby gas can flow from chamber 4 to chamber 3, and then out through nozzle 9 in chamber 3 spaced upwardly from the tubesheet 2. From the nozzle 9 gas flows to a downstream process as shown by the arrow in FIG. 1.

In FIG. 2, the upper ends of the jackets 20 are attached by a weld 22 to sleeves 23. In turn, the sleeves 23 are joined by a gastight weld to the tubesheet 2. As shown in FIG. 2, the weld 22 faces chamber 3. Dimensions have been selected so that the inside diameter of the sleeves 23 is larger than the outside diameter of the jackets 20 providing an annular gap between the jackets and the sleeves with the gap being open to the chamber 4. The upper end of the annular gap 31 is closed by the weld 22.

The vertically-extending reformer tubes 18 are placed by means of brackets 24, note FIG. 2, on the welds 22, and are permanently fixed at this location, if necessary. The brackets may also remain loose on the supports when a suspended arrangement is selected as shown in the drawing. However, the present invention is not restricted to such an arrangement.

The gas flow through the device is substantially as follows:

The feedgas mixture flows through nozzle 14 into line 13 and then into the inner hollow chamber 15 of the tubesheet 2. From the chamber 15, the mixture flows through one or more outlet openings 17 into the space 26 formed by the outer hollow chamber 16 about the inner hollow chamber 15. The feedgas mixture then flows around the inner hollow chamber 15 to the connecting tubes 27 on the upper side of the tubesheet 2 into the head sections 28 of the reformer tubes 18. The gas flow continues downwardly through the catalyst-filled reformer tubes 18 into the chamber 4 where it mixes with the other gas streams flowing into the chamber 4 through nozzles 10, 10a. As indicated by the arrows in the chamber 4, in FIG. 1, the gas mixture flows from chamber 4 through annular gap 21 between the reformer tubes 18 and the jackets 20 into the chamber 3. The product gas flows out of the chamber 3 through the nozzle 9.

On the right-hand side of FIG. 2, dimension $h_1$ denotes the height of the inner chamber 15. Height $h_1$ may be varied while the wall spacings $h_2$ between the two chambers should be equal to achieve a symmetrical arrangement while maintaining a sufficient flow velocity with consequent uniform cooling of the tubesheet.

This embodiment of the invention as described above, by way of example, permits, of course, a plurality of modifications without deviating from the basic concept of the invention. For example, the inner hollow chamber 15 may be formed of several components with a meander or spiral configuration, and it may be equipped with outside and/or inside baffles to define a specific flow pattern.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

I claim:

1. Device for use in manufacturing a product gas containing hydrogen and carbon oxide from a feedgas mixture comprised substantially of hydrocarbons mixed with steam, said device comprising a vertically extending vessel having an interior space, a horizontally extending tubesheet connected in said vessel for dividing the interior space into a first chamber on one side of said tubesheet and a second chamber on an opposite side of said tubesheet, a plurality of axially extending reformer tubes having closed ends and open ends located within the interior space and extending through said tubesheet from said first chamber into said second chamber, said tubesheet forming a distribution chamber for supplying a feedgas mixture into said reformer tubes, said tubesheet comprising an inner hollow body and an outer hollow body surrounding said inner hollow body on all sides, an inlet line connected to and communicating with an interior of said inner hollow body for the admission of a feedgas mixture into the interior of said inner hollow body, said inner hollow body having a flow opening for communication between the interior of said inner hollow body and a space between the interior of said inner hollow body and a space between said inner hollow body and said outer hollow body, and a connecting tube connected between the closed end of each of said reformer tubes and said outer hollow body for communicating the interior of said reformer tubes with the space between said inner and outer hollow bodies, a jacket laterally enclosing and spaced outwardly from each said reformer tube for forming an annular space extending along each said tube from the first chamber through the tubesheet and for at least a part of the axial length of each said tube within said second chamber for establishing communication between said first and second chambers, and an outlet nozzle connected to said first chamber for the outlet of product gas from the second chamber.

2. Device, as set forth in claim 1, wherein said inner hollow body is concentrically positioned within said outer hollow body, wherein said inlet line has one end extending into said vessel and an opposite end connected to said inner hollow body.

3. Device, as set forth in claim 2, wherein said horizontally extending tubesheet divides the interior space in said vessel into an upper said first chamber and a lower said second chamber.

4. Device, as set forth in claim 3, wherein said flow opening is provided in the lower side of said inner hollow body for flowing the feedgas mixture out of said inner hollow body into said outer hollow body, and flow openings provided on the upper side of said outer hollow body, said connecting tube connected to the flow openings in the upper side of said hollow body and extending upwardly to the closed ends of said reformer tubes within said first chamber.

5. Device, as set forth in claim 4, wherein at least one said connecting tube is provided for each said reformer tube.

6. Device, as set forth in claim 1, wherein a sleeve is located around each of said jackets within said tubesheet with said sleeve spaced outwardly from said jacket forming an annular space therearound.

7. Device, as set forth in claim 6, wherein each of said sleeves has an inside diameter larger than the outside diameter of said jackets forming said annular space therebetween, a gastight seal formed between the ends of the said jackets and said sleeves on said side of said tubesheet facing said first chamber securing said sleeves to said tubesheet and forming a seal for the annular space between said sleeves and said jackets.

8. Device, as set forth in claim 7, wherein a supporting bracket is secured to each of said reformer tubes and said bracket rests on the weld between the associated said sleeve and said jacket.

* * * * *